June 18, 1929.                C. A. JOHNSON                1,717,708
                                 FLYTRAP
                            Filed June 25, 1928
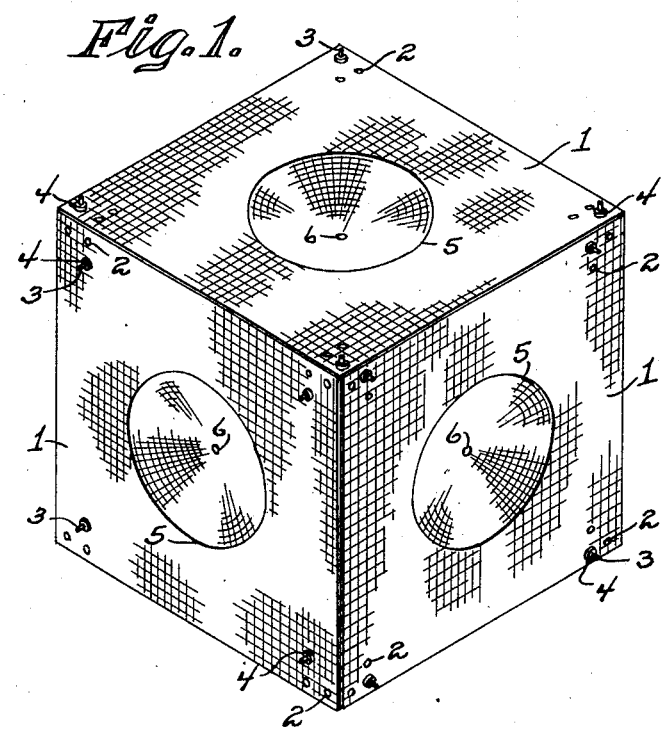
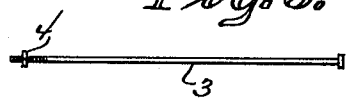
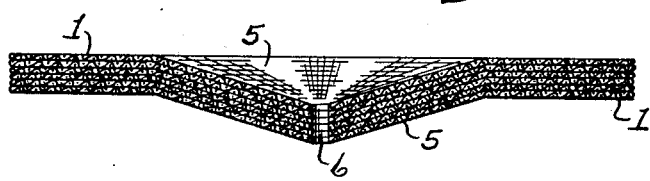
Charles A. Johnson
INVENTOR
BY Victor J. Evans
ATTORNEY
WITNESS:

Patented June 18, 1929.

1,717,708

UNITED STATES PATENT OFFICE.

CHARLES A. JOHNSON, OF MIDDLETOWN, CALIFORNIA.

FLYTRAP.

Application filed June 25, 1928. Serial No. 287,907.

This invention relates to insect traps and its general object is to provide a trap that includes six equal and like sides that are held in cube formation when assembled to form a trap, but can be placed in nested formation to facilitate packing when being shipped.

A further object of the invention is to provide a trap formed from pieces of foraminated material detachably held together and having entrances arranged in a manner to guide the insects in the trap as well as to provide the nesting feature of the pieces when arranged for shipping.

A further object of the invention is to provide a trap of the character set forth, that is extremely simple in construction, inexpensive to manufacture, easy to assemble and is efficient in operation and service.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a perspective view of a trap forming the subject matter of the present invention and showing the same in assembled position.

Figure 2 is a fragmentary edge elevation of one of the pieces which make up the trap.

Figure 3 is a detail view of one of the securing rods.

Figure 4 is an edge elevation of the pieces which form the walls of a trap in nested position.

Referring to the drawings in detail, it will be noted that my trap is made up of six pieces of foraminated material and these pieces which are exactly alike are indicated by the reference numeral 1.

The pieces are square and when secured together to provide a trap present the cube formation as shown in Figure 1. Each of the pieces has arranged adjacent the corners thereof openings 2 disposed in groups of threes as shown, but it will be obvious that any number of openings may be provided. When the pieces are assembled in trap formation, the openings of the opposed pieces are arranged in registration and headed rods 3 are adapted to be disposed through some of the registering openings for securing the pieces in their assembled position through the medium of nuts 4 threadedly secured to said rods.

Formed centrally in each piece is a conical recess 5 having an opening 6 arranged in the apex thereof, and these recesses and openings 6 provide entrances disposed on the six sides of the trap as suggested in Figure 1, when the pieces are assembled, but when the pieces are arranged as shown in Figure 4, the conical recesses provide for the nesting action of the respective pieces.

The recesses extend inwardly and thereby have a tendency to guide the insects toward the openings 6 as will be apparent.

While I have shown rods for securing all of the pieces in assembled position, I want it understood that only four of the sides may be secured through the medium of the rods and nuts therefor, as the other sides may be secured in operative position by wire or other like flexible material disposed through other of the openings 2. The trap may be suspended from a suitable supporting means by having a flexible element secured in some of the openings.

The bait may be supported in the trap in any well known manner and can be suspended therein from a wire or other means placed in the trap as desired.

From the above description and disclosure of the drawings, it will be obvious that I have provided an insect trap that includes a plurality of pieces or sections forming the walls thereof when the sections are secured in assembled position, and due to the novel arrangement of the entrances, the sections can be nicely nested for shipment or storage.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. An insect trap of the character described comprising a plurality of sections, said sections being capable of being nested in each other, each section being provided with a conical recess formed centrally therein with an opening at the apex of each recess, said sections being formed with openings adjacent the corners thereof, means for detachably securing the sections in assembled position and being passed through some of said openings, and other of said openings being adapted to receive means for suspending said trap from a support.

2. A trap of the character described comprising a plurality of sections, each section being provided with a conical shape recess arranged centrally thereof with an opening disposed at the apex of each recess, said sections being formed with openings adjacent the corners thereof, rods having threaded ends and adapted to be passed through some of said openings, nuts for said rods for holding the sections in trap formation, and other of said openings being adapted to receive means for suspending said trap from a support.

In testimony whereof I affix my signature.

CHARLES A. JOHNSON.